(12) United States Patent
Nicq

(10) Patent No.: US 8,474,802 B2
(45) Date of Patent: Jul. 2, 2013

(54) VIBRATION ISOLATOR

(75) Inventor: Geoffroy Nicq, Montargis (FR)

(73) Assignee: Barry Wright Corporation, Wilmington, DE (US)

( * ) Notice: Subject to any disclaimer, the term of this patent is extended or adjusted under 35 U.S.C. 154(b) by 750 days.

(21) Appl. No.: 12/457,475

(22) Filed: Jun. 11, 2009

(65) Prior Publication Data

US 2010/0314812 A1 Dec. 16, 2010

(51) Int. Cl.
*F16M 1/00* (2006.01)
*F16F 9/18* (2006.01)

(52) U.S. Cl.
USPC .............. 267/140.2; 267/140.13; 267/147; 267/128; 188/281

(58) Field of Classification Search
USPC ............ 267/139, 140, 140.11, 140.13, 140.2, 267/140.3, 140.4, 141, 141.1, 141.2, 147, 267/124, 128; 188/266, 268, 312, 297, 281
See application file for complete search history.

(56) References Cited

U.S. PATENT DOCUMENTS

| 2,488,730 | A | * | 11/1949 | Lake et al. | 74/47 |
| 3,131,921 | A | * | 5/1964 | Karbowniczek | 267/128 |
| 3,752,462 | A | * | 8/1973 | Wight, Jr. | 267/140 |
| 4,074,896 | A | * | 2/1978 | Eftefield | 267/139 |
| 4,085,832 | A | * | 4/1978 | Gaines et al. | 188/268 |
| 5,230,407 | A | * | 7/1993 | Smith et al. | 188/281 |
| 5,375,823 | A | * | 12/1994 | Navas | 623/17.15 |
| 6,109,636 | A | * | 8/2000 | Klein et al. | 280/284 |
| 6,443,437 | B1 | * | 9/2002 | Beyene et al. | 267/64.26 |
| 6,499,570 | B2 | * | 12/2002 | Chu | 188/129 |
| 7,476,238 | B2 | * | 1/2009 | Panjabi | 606/257 |
| 2009/0194920 | A1 | * | 8/2009 | Love et al. | 267/121 |

* cited by examiner

*Primary Examiner* — Thomas Irvin
(74) *Attorney, Agent, or Firm* — Clark & Brody

(57) ABSTRACT

The invention relates to a vibration isolator comprising a canister which ends are closed by end caps and a shaft able to move inside the canister, wherein the shaft comprises a piston-like shaped part for separating the canister in two parts:
  the first part being defined between the piston-like shaped part of the shaft and the first end cap, and comprising at least one resilient and damping element able to be compressed by a compression movement of the shaft on a first nominal stroke;
  the second part being defined between the piston-like shaped part of the shaft and the second end cap, and comprising at least one resilient and damping element able to be compressed by a tension movement of the shaft on a second nominal stroke;
  the tangential stiffness of the vibration isolator being, on at least one part of the first nominal stroke of the shaft, at least twice as lower as its tangential stiffness on the entire second nominal stroke of the shaft.

11 Claims, 4 Drawing Sheets

VIBRATION ISOLATOR

Figure 1:
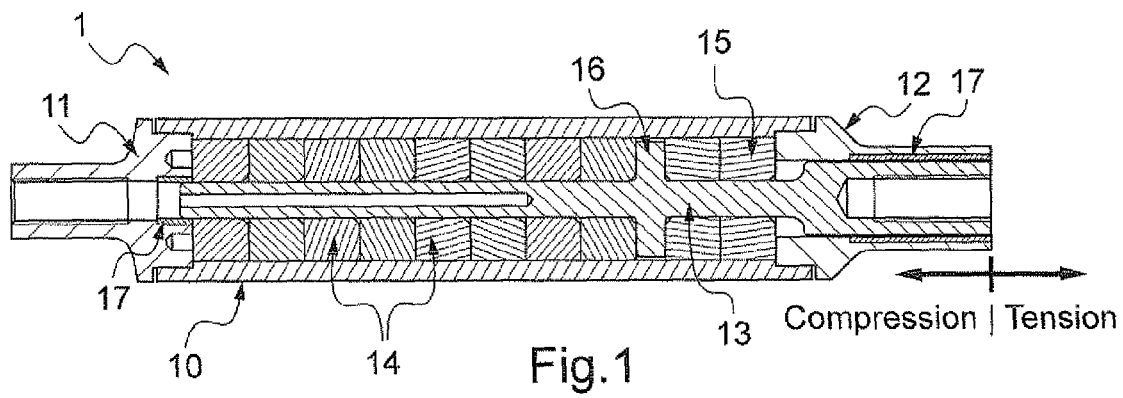

The invention relates to a vibration isolator.

The invention particularly relates to a vibration isolator to be provided between a moving part and a static frame.

The invention may find application in the field of aircrafts, and more generally in the vibration control industry.

Generally, an aircraft landing system comprises a landing gear, a door for closing the landing gear trap and two actuators, one for the opening and the closing of the door and the other for the deployment and the folding of the landing gear. In this system, the landing gear and the door of the landing gear trap are both maintained in position thanks to their respective actuator, both during the flight and during the landing.

This type of system has widely proved its efficiency.

New systems are trying to reduce the cost and weight of such a system while meeting the requirements of aircrafts manufacturers.

An aim of the invention is to propose such a system.

The invention proposes to remove the actuator of the door to save weight and to add a vibration isolator between the landing gear and the door, this vibration isolator being capable of meeting the requirements of aircraft manufacturers, even if the door is made in a material lighter in weight.

In such a case, the landing gear forms the static frame and the door forms the moving part.

Thus, when the landing gear is deployed under the action of its actuator, the door, for instance made in a light, composite material, opens at the same time as the landing gear deploys. Similarly, the door closes at the same time as the landing gear is folded into the landing gear trap.

More precisely, the invention proposes a vibration isolator comprising a canister which ends are closed by end caps and a shaft able to move inside the canister, wherein the shaft comprises a piston-like shaped part for separating the canister in two parts:

the first part being defined between the piston-like shaped part of the shaft and the first end cap, and comprising at least one resilient and damping element able to be compressed by a compression movement of the shaft on a first nominal stroke;

the second part being defined between the piston-like shaped part of the shaft and the second end cap, and comprising at least one resilient and damping element able to be compressed by a tension movement of the shaft on a second nominal stroke;

the tangential stiffness of the vibration isolator being, on at least one part of the first nominal stroke of the shaft, at least twice as lower as its tangential stiffness on the entire second nominal stroke of the shaft.

The vibration isolator will also have at least one of the following features:

its tangential stiffness is, on the entire first nominal stroke of the shaft, at least twice as lower as its tangential stiffness on the entire second nominal stroke of the shaft;

the first part of the canister comprises a number of resilient and damping elements which differs from the number of resilient and damping elements comprised in the second part of the canister;

the resilient and damping elements are identical;

at least one of the end caps is screwable on the canister in order to adjust a pre-load exerted on said at least one resilient and damping element;

it comprises a spacer inserted between one of the end caps and said at least one resilient and damping element;

it comprises a damping means between the spacer and the shaft disposed inside said spacer so that it does not bear any load;

the canister comprises a ring-shaped inner wall able to cooperate with the piston-like shaped part of the shaft for providing a step of tangential stiffness at the transition between the two nominal strokes;

it comprises a washer disposed around the shaft, one side of the washer being in contact with a resilient and damping element of the second part of the canister, its other side being both in contact with the piston-like shaped part of the shaft and the inner wall of the canister;

it comprises at least one stroke bumper between the ring-shaped inner wall and the piston-like shaped part of the shaft for damping the end stroke of the shaft when the vibration isolator operates in tension;

said at least one resilient and damping element is a metal mesh cushion;

the metal mesh cushion is made of stainless steel and has the following features: number of wires n comprised between $20 \leq n \leq 90$, diameter d of a wire comprised between $0.003$ in. $\leq d \leq 0.009$ in., mass w comprised between $20$ g $\leq w \leq 40$ g, section of the cushion comprised between $0.5$ inch$^2 \leq S \leq 2.5$ inch$^2$;

said at least one resilient and damping element also comprises an elastomeric material, such as rubber;

it provides a damping factor f such that $f \geq 0.18$ for a frequency comprised between 8 Hz and 12 Hz during its lifetime when it operates in compression, this damping factor f being such that $f \geq 0.25$ when the vibration isolator 1 operates for the first time in compression;

it provides a damping factor f such that $f \geq 0.18$ for a frequency comprised between 8 Hz and 12 Hz during its lifetime when it operates in tension, this damping factor f being such that $f \geq 0.2$ when the vibration isolator 1 operates for the first time in tension.

The invention also proposes a device comprising:

a moving part;

a static frame to isolate from said moving part;

a vibration isolator according to the invention mounted between said moving part and said static frame, the maximum stiffness of the static frame being higher than the stiffness of the moving part.

Figure 2A:
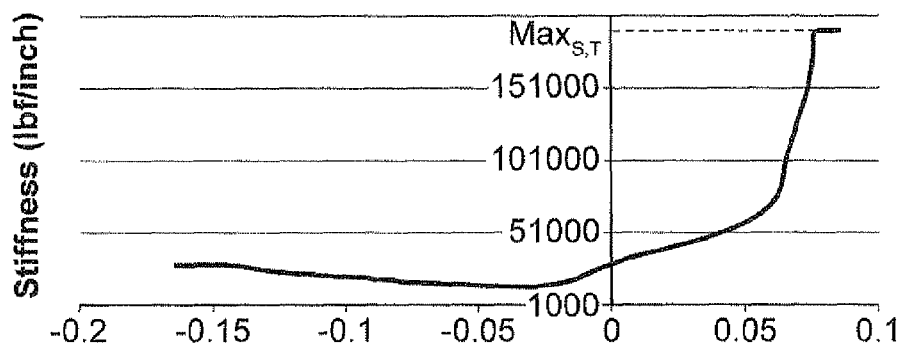
Figure 2B:
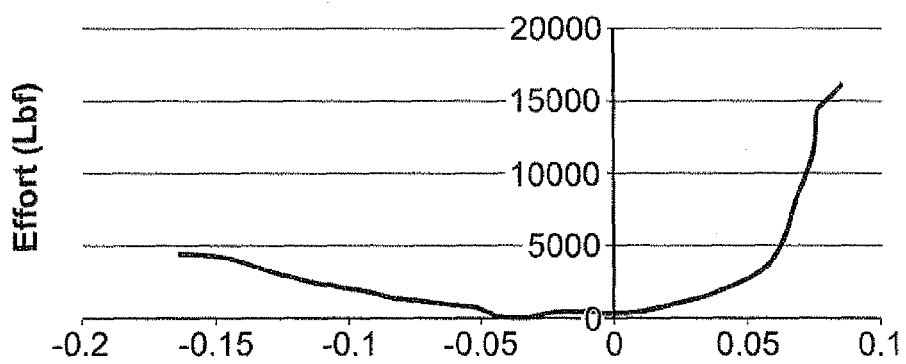
Figure 3:
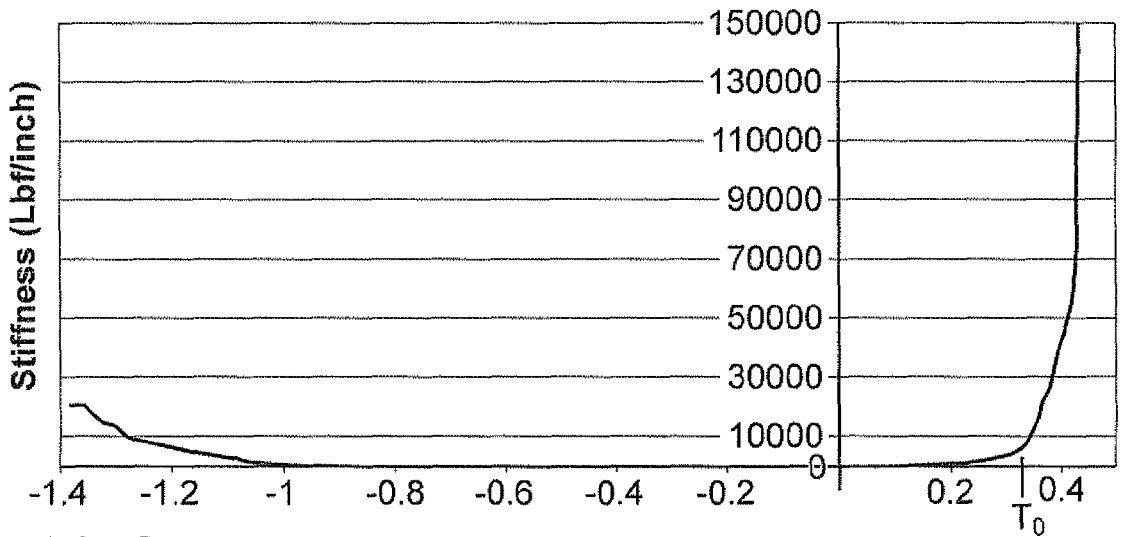
Figure 7A:
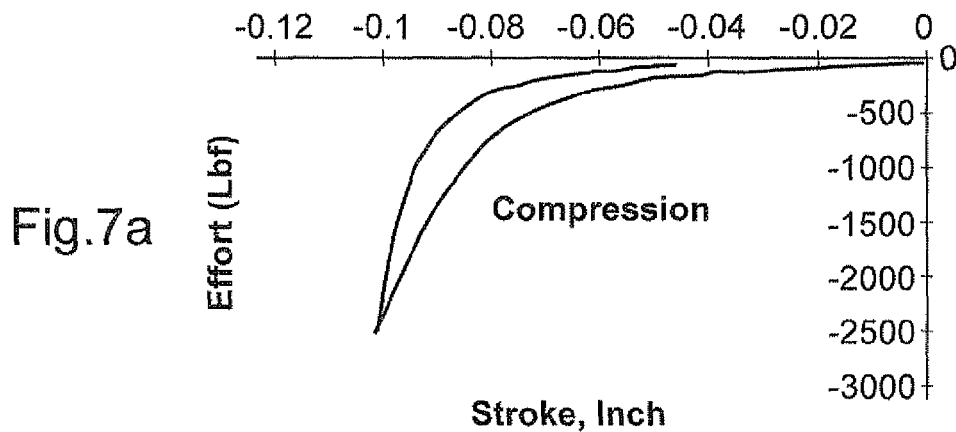
Figure 7B:
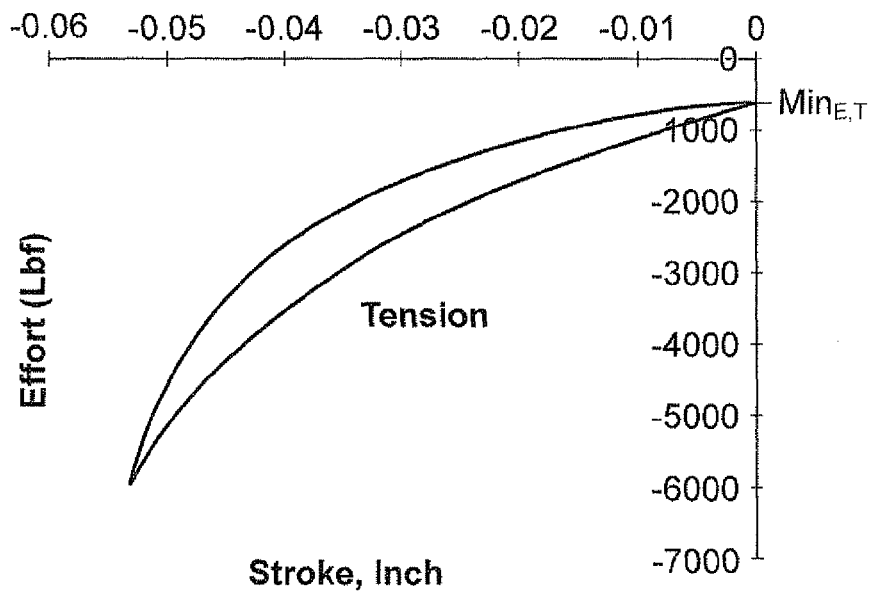
Figure 4:
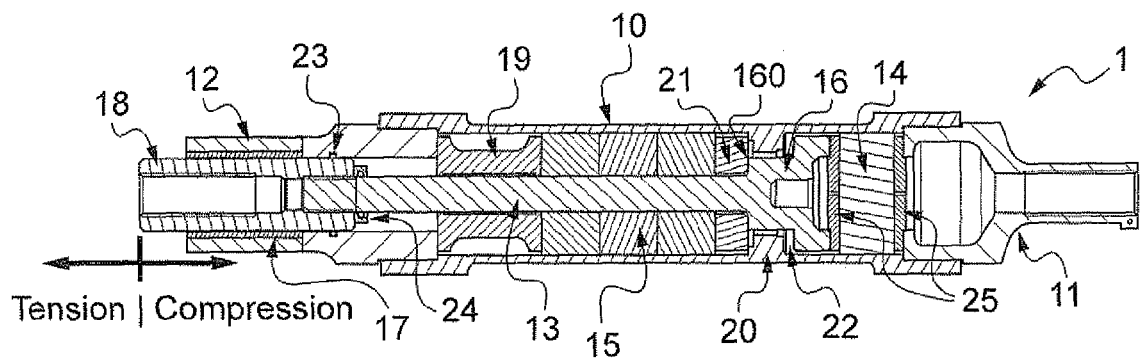
Figure 6A:
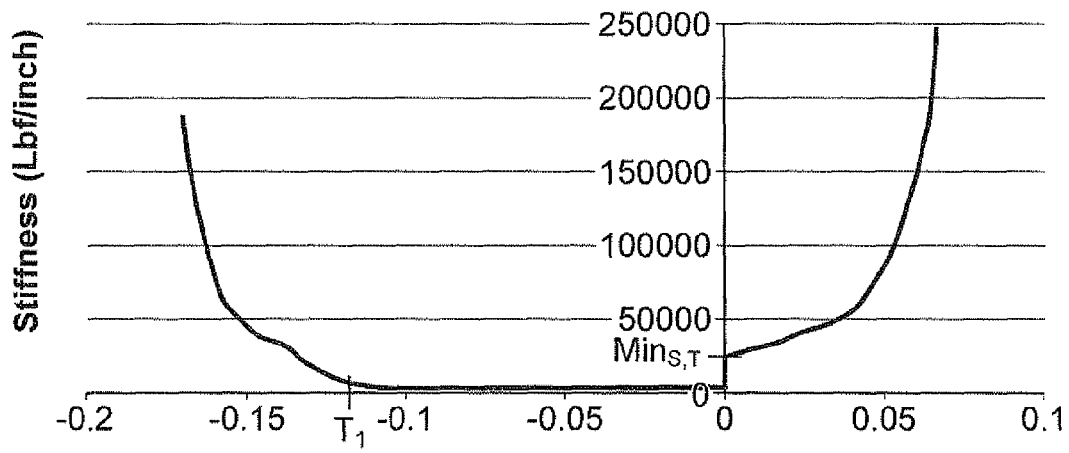
Figure 6B:
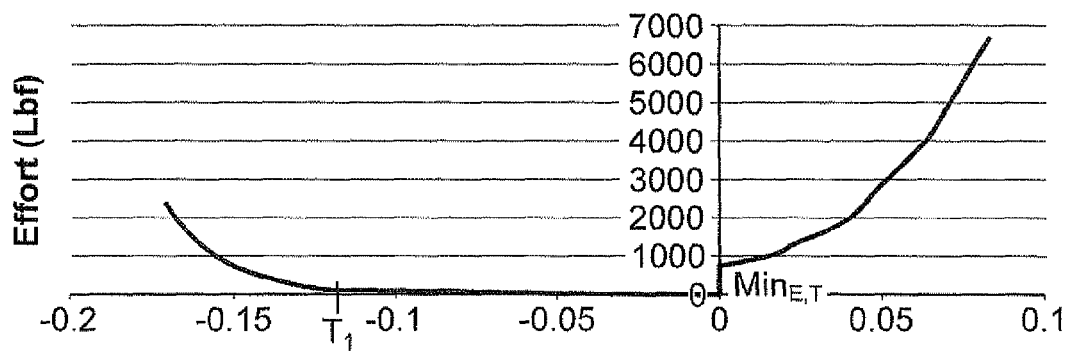
Figure 8:
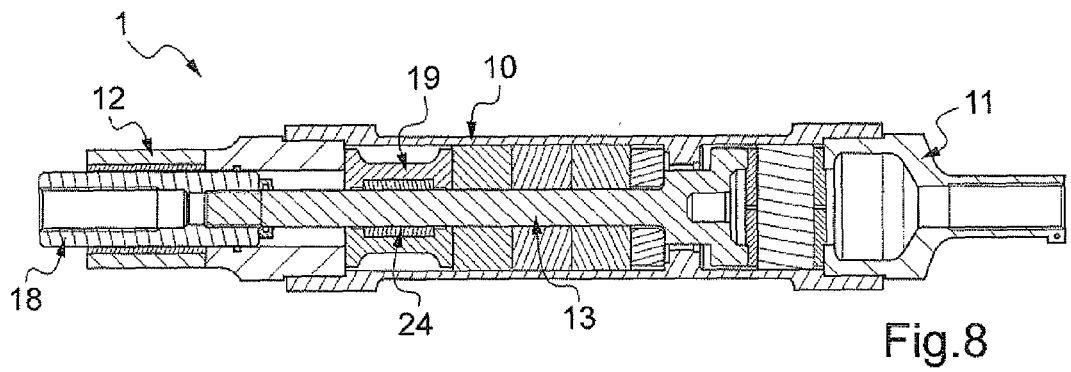
Figure 5A:
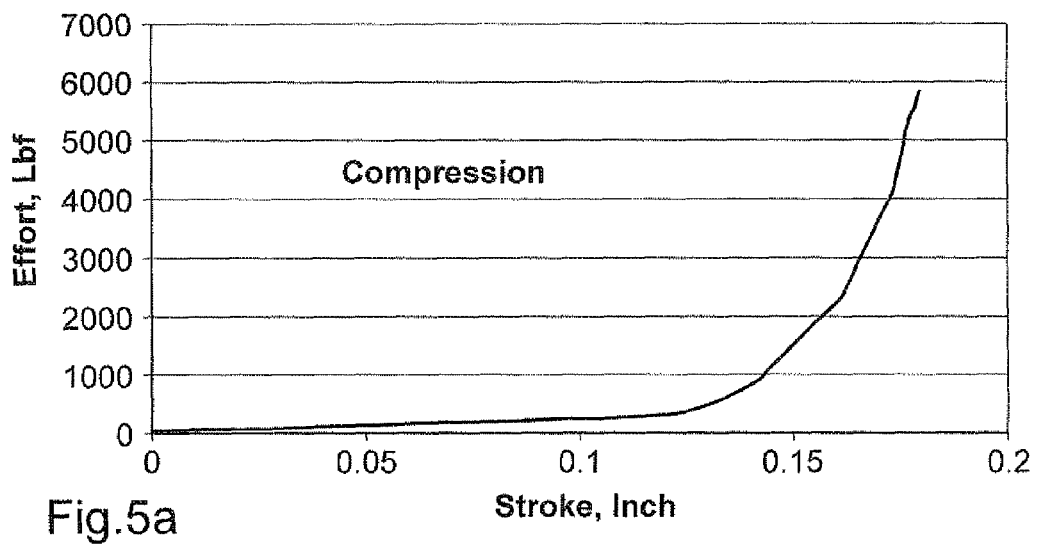
Figure 5B:
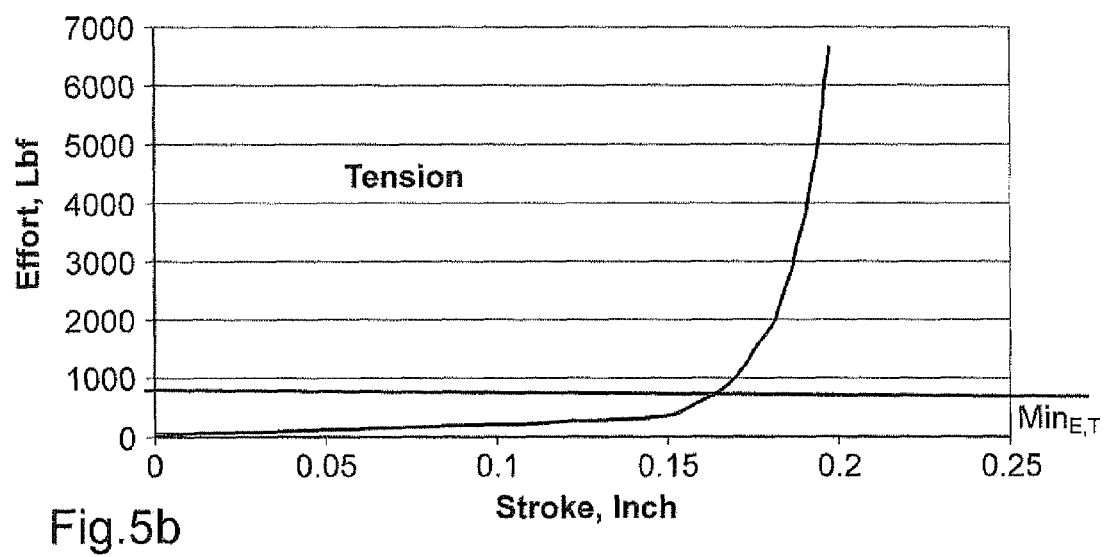

The invention shall be better understood, and other aims, advantages and features will appear by reading the following description, written in regard of the accompanying drawings, on which:

FIG. 1 is a cut-away longitudinal view of a vibration isolator according to a first embodiment of the invention, said vibration isolator comprising a canister separated in two part by a piston-like shaped shaft, each part of the canister being filled with resilient and damping elements able to be stressed by the movement of the shaft inside the canister;

FIG. 2, comprising FIGS. 2(a) and 2(b), respectively provides the evolution of the tangential stiffness of the vibration isolator shown on FIG. 1 as a function of the stroke of the shaft in the canister, and the evolution of the effort exerted on the shaft as a function of its stroke, when a static pre-load is exerted on the resilient and damping elements;

FIG. 3 provides the evolution of the tangential stiffness of the vibration isolator shown on FIG. 1 as a function of the stroke of the shaft in the canister, when no static pre-load is exerted on the resilient and damping elements;

FIG. 4 is a cut-away longitudinal view of a vibration isolator according to a second embodiment of the invention;

FIG. 5, comprising FIGS. 5(a) and 5(b), respectively provides the evolution of the effort applied to one resilient and damping element intended to be placed in the first part of the canister of FIG. 4, as a function of the stroke of a mechanical piece applying this effort to said resilient and damping element, and the evolution of the effort applied to one resilient and damping element intended to be placed in the second part of the canister of FIG. 4, as a function of the stroke of a mechanical piece applying this effort to said resilient and damping element;

FIG. 6, comprising FIGS. 6(a) and 6(b), respectively provides the evolution of the tangential stiffness of the vibration isolator shown on FIG. 4 as a function of the stroke of the shaft into the canister, and the evolution of the effort exerted on the shaft as a function of its stroke;

FIG. 7, comprising FIGS. 7(a) and 7(b), respectively provides the hysteresis evolution of the effort applied to the shaft of the vibration isolator shown on FIG. 4, as a function of the stroke of the shaft for a first mode of operation and for a second mode of operation;

FIG. 8 is a cut-away longitudinal view of a variant of the second embodiment shown on FIG. 4.

For all the description provided below, the tangential stiffness of a resilient and damping element will be defined by the derivative of the curve providing the evolution of the effort applied to this element as a function of the stroke of a mechanical piece transmitting this effort to this element. Similarly, the tangential stiffness of the vibration isolator will be defined by the derivative of the curve providing the evolution of the effort applied to this isolator as a function of the stroke of the shaft moving inside the canister of the isolator.

In addition, for a better understanding of the interest of the invention, the main advantages of the invention will be explained in view of a landing gear system providing a mechanical link between the door of the landing gear trap and the landing gear.

FIG. 1 shows a first embodiment of the vibration isolator 1.

The vibration isolator 1 shown on FIG. 1 comprises a canister 10 which ends are closed by end caps 11, 12, a shaft 13 able to move inside the canister 10, and resilient and damping elements 14, 15 filling the space between the inner wall of the canister and the shaft 13.

The vibration isolator may be mounted on the landing gear (static part) on the side of the end cap 11, and on the door of the landing gear trap (moving part) on the side of the end cap 12.

The vibration isolator 1 illustrated on FIG. 1 is shown in a position where its shaft 13 is in its static position. The static position is defined by the position of the shaft where no external effort is applied on the shaft.

When the aircraft is landing, the door is open and the landing gear is in a vertical position for landing. As shown on FIG. 1, the contact between the ground and the landing gear brings about a compression effort on the shaft 13, which tends to push the shaft 13 inside the canister 10 from its static position towards end cap 11. This effort compresses the resilient and damping elements 14. The vibration isolator operates in compression.

When the aircraft is flying, the door is closed and the landing gear is in a horizontal position in its trap. The weight of the door and the air flow passing on the external side of the door tend to pull the shaft 13 outside the canister 10 from its static position towards end cap 12. As shown on FIG. 1, a tension effort is exerted on the shaft 13 which compresses the resilient and damping elements 15. The vibration isolator 1 operates in tension.

The end caps 11, 12 are mounted on the canister 10, the end cap 12 being screwable on the canister 10. The end caps 11, 12 both comprise a hollow section for receiving the shaft 13.

Bearings 17 are inserted between the shaft 13 and the end caps 11, 12 for guiding the shaft in the hollow section of the end caps 11, 12. Means (not shown) for sealing the junction between the shaft 13 and the end caps 11, 12 are also provided. These means may be O-rings inserted inside a corresponding circumferential groove made in the end caps 11, 12 or rubber layers.

The shaft 13 comprises a piston-like shaped part 16 for separating the canister in two parts. A first part of the canister 10 extends between the piston-like shaped part 16 of the shaft 13 and a first end cap 11. The second part of the canister 10 extends between the piston-like shaped part 16 of the shaft 13 and the other end cap 12.

Each of the two parts of the canister 10 is filled by resilient and damping elements 14, 15.

All the resilient and damping elements 14 filling the first part of the canister are identical but different from the resilient and damping elements 15 filling the second part of the canister.

The resilient and damping elements 14 used in the first part of the canister are metal mesh cushions. The features of a cushion are given below:
  type of material: stainless steel
  mass: 21 g
  forming load: 4.5 t
  number of wires: 52
  diameter of a wire: 0.05 inch
  section of the cushion: 0.714 inch$^2$ The resilient and damping elements 15 used in the second part of the canister are also metal mesh cushions. The features of a cushion are given below:
  type of material: stainless steel;
  mass: 24 g
  forming load: 9 t
  number of wires: 52
  diameter of a wire: 0.05 inch
  section of a cushion: 0.714 inch$^2$ The behaviour of the vibration isolator 1 depends on the type of cushion, on the pre-load applied to the cushion(s) and on the number of cushions comprised in the stack.

All these features are of equal importance.

The features of the cushions are provided here above.

The pre-load applied to the cushions is 600 Lbf in the embodiment illustrated on FIG. 1.

The setting of the pre-load is obtained by screwing the end cap 12 on the canister 10. Indeed, the end cap 12 can move inside the canister 10 for exerting a static load on the elements 15, that static load being transmitted to the resilient and damping elements 14 through the piston-like shaped part 16 of the shaft 13.

The pre-load exerted on the metal mesh cushions 14, 15 allows selecting only a part of the displacement-effort curve of the metal mesh cushion.

As can be seen on FIG. 1, the first part of the vibration isolator 1 comprises a number of metal mesh cushions 14 which is higher than the number of metal mesh cushions 15 contained in the second part of the canister 10. More precisely, the first stack of metal mesh cushions 14 comprises eight cushions whereas the second stack of metal mesh cushions 15 only comprises two cushions.

Once given the features of the cushions 14, 15 and the pre-load exerted on them, adjusting the number of metal mesh cushions on each part of the canister 10 allows adjusting the tangential stiffness of the vibration isolator 1, when it operates in tension and in compression. Indeed, the tangential stiffness of a stack of cushions is the tangential stiffness of one cushion divided by the number of cushions comprised in the stack.

An evolution of the tangential stiffness of the vibration isolator 1 shown on FIG. 1 as a function of the stroke of the shaft 13 inside the canister 10 is given on FIG. 2(*a*). The corresponding evolution of the external effort applied to the shaft 13 as a function of its stroke inside the canister 1 is shown on FIG. 2(*b*).

It should be noted that the static position of the shaft 13 corresponds to the value zero of the stroke (no deflection) on this figure.

The operation of the vibration isolator 1 can be summarized as follows.

When a compression effort is exerted on the shaft 13 of the vibration isolator 1, the metal mesh cushions 14 disposed in the first part of the canister 10 are compressed and the other cushions 15 are stretched. Inversely, when a tension effort is exerted on the shaft 13 of the vibration isolator 1, the metal mesh cushions 15 disposed in the second part of the canister 10 are compressed and the other cushions 14 are stretched.

When the metal mesh cushions 14 of the first part of the canister are compressed by the compression effort exerted on the shaft 13, the metal mesh cushions 15 remain below their natural length in a range of displacement of the shaft 13, so that they participate to the behaviour of the vibration isolator. This range depends on the pre-load exerted by the end cap 12 on the metal mesh cushions 14, 15. In the present case, where the pre-load is 600 Lbf, the range is from 0 to −0.035 inch. Indeed, the value −0.035 inch for the stroke of the shaft 13 corresponds to an effort equal to zero, as it can be seen on FIG. 2(*b*).

Beyond this range of displacement of the shaft, the metal mesh cushions 15 remain at their natural length and provide no contribution to the behaviour of the vibration isolator 1. In that case, it means that only the cushions 14 provide a contribution to the behaviour of the vibration isolator beyond a stroke of −0.035 inch.

Similarly, when the metal mesh cushions 15 of the second part of the canister 10 are compressed by the tension effort exerted on the shaft 13, the metal mesh cushions 14 remain below their natural length in a range of displacement of the shaft 13. This range also depends on the pre-load exerted by the end cap 12 on the metal mesh cushions 14, 15. Beyond this range of displacement of the shaft, the metal mesh cushions 14 remain at their natural length and provide no contribution to the behaviour of the vibration isolator 1.

As can be seen on FIG. 2(*a*), the tangential stiffness is very different whether the vibration isolator 1 operates in compression or in tension.

In particular, in tension, the behaviour of the vibration isolator 1 is highly non-linear. Indeed, it can be seen that the tangential stiffness in tension quickly changes as a function of the stroke. In compression, the behaviour of the vibration isolator is slightly non-linear, even quasi-linear as the tangential stiffness in compression changes very slowly as a function of the stroke.

More precisely, we can define a first nominal stroke of the shaft 13 when the vibration isolator operates in compression. In that case, the first nominal stroke is comprised between −0.15 inch and 0. Similarly, we can define a second nominal stroke of the shaft 13 when the vibration isolator operates in tension. In that case, the second nominal stroke is comprised between 0 and 0.02 inch, and preferably between 0 and 0.01 inch.

The tangential stiffness of the vibration isolator 1 is, on at least one part of the first nominal stroke of the shaft 13, at least twice as lower as the tangential stiffness of the vibration isolator 1 on the entire second nominal stroke of the shaft.

The ratio between the tangential stiffness of the vibration isolator when it operates in tension and its tangential stiffness when it operates in compression may exceed the value 2.5, 3, 4 or even 5 on at least one part of the first nominal stroke of the shaft 13 and on the entire second nominal stroke of the shaft.

With this design, it is possible to obtain a low-deflection vibration isolator 1 by decoupling the behaviour in tension and in compression.

In particular, a very low deflection is obtained in tension to limit the stroke of the shaft when the vibration isolator operates in tension, thus limiting the deflection of the moving part. When the moving part is a door closing a landing gear trap, it means that any movement of the door during the flight of an aircraft is avoided.

When the vibration isolator 1 operates in compression, the low tangential stiffness provided by the metal mesh cushions 14 implies a larger deflection of the shaft. This larger deflection is used for providing a good damping in nominal operation. Indeed, when the vibration isolator 1 operates in compression, it provides a damping factor f such that $f \geq 0.18$ for a frequency comprised between 8 Hz and 12 Hz during the lifetime of the vibration isolator.

This damping factor f is such that $f \geq 0.25$ when the vibration isolator 1 operates for the first time in compression.

It means that most of the vibrations coming from the ground through the landing gear during landing are damped by the vibration isolator.

A good damping is also obtained when the vibration isolator 1 operates in tension. Indeed, it then provides a damping factor f such that $f \geq 0.18$ for a frequency comprised between 8 Hz and 12 Hz during the lifetime of the vibration isolator. The lifetime of the vibration isolator should be at least the same as the lifetime of the aircraft.

This damping factor f is such that $f \geq 0.2$ when the vibration isolator 1 operates for the first time in tension.

During the flight, few vibrations are transmitted from the door to the landing gear through the vibration isolator.

If no pre-load is exerted on the cushions 14, 15, the value zero of the effort exerted on the shaft is obtained at the static position of the shaft 13. Then, only the metal mesh cushions 14 are working when the vibration isolator 1 operates in compression and only the metal mesh cushions 15 are working when the vibration isolator 1 operates in tension. The behaviour of the vibration isolator 1 when it operates in tension is decoupled from its behaviour when it operates in compression.

The evolution of the tangential stiffness of the vibration isolator 1 of FIG. 1, obtained without pre-load on the metal mesh cushions 14, 15 is shown on FIG. 3.

The absence of pre-load is interesting when the vibration isolator 1 operates in compression, as the tangential stiffness remains low on the entire first nominal stroke range of the shaft. However, it is less interesting when the vibration isolator operates in tension as the tangential stiffness strongly increases only after a minimum stroke $T_0$ of value $T_0=0.035$ inch of the shaft, value which is beyond the nominal stroke range comprised between 0 and 0.02 inch. A good compromise must then be made on the pre-load to obtain convenient behaviours of the vibration isolator.

A pre-load is better in order to limit the fatigue problems of the cushions.

Other embodiments, likely to provide the same effects as that one illustrated on FIGS. 2(*a*) and 2(*b*), may be considered.

In a variant of the first embodiment, all the metal mesh cushions 14 filling the first part of the canister may be identical but different from the metal mesh cushions 15 filling the second part of the canister, the number of cushions 14, 15 in each part of the canister 10 being the same.

In another variant of the first embodiment, all the metal mesh cushions 14, 15 may be identical, the number of cushions 14, 15 in each part of the canister 10 being different.

A vibration isolator used between a landing gear and the door closing the landing gear trap is 7.5-10 inch long and has an external diameter comprised between 1.3 inch and 1.6 inch. Thus, when the number of metal mesh cushions is not able to fill the space between an end cap 11, 12 and the piston-like shaped part 16 of the shaft within the canister, a spacer (not shown) can be provided between the end cap 11, 12 and the metal mesh cushions.

FIG. 4 shows a second embodiment of the vibration isolator 1.

The vibration isolator 1 shown on FIG. 3 comprises a canister 10 which ends are closed by end caps 11, 12, a shaft 13 able to move inside the canister 10, a support piece 18 mounted in one end cap 12 for the shaft 13 to move in a straight manner inside the canister 10, and resilient and damping elements 14, 15.

The end caps 11, 12 are mounted on the canister 10 and are both screwable on the canister 10.

The support piece 18 is inserted inside a hollow section of one 12 of the end caps 11, 12. The support piece 18 is also screwed to one end of the shaft 13, and locked in place with a jam nut 24. Therefore, no movement exists between the shaft 13 and the support piece 18, so that no sliding movement in the canister of the resilient and damping elements 15 is possible. The support piece 18 may be seen as an adapter between the shaft 13 and the end cap 12, which weight is limited thanks to its hollow section. It also allows a junction with the moving part and engages the shaft and an axe leading to the moving part.

A bearing 17 and a sealing means 23 are inserted between the support piece 18 of the shaft 13 and the end cap 12. The sealing means 23 may be an O-ring inserted in a circumferential groove made in the end cap 12 or a rubber layer.

The shaft 13 comprises a piston-like shaped part 16 for separating the canister in two parts. A first part of the canister 10 extends between the piston-like part 16 of the shaft 13 and a first end cap 11. The second part of the canister 10 extends between the piston-like part 16 of the shaft 13 and the other end cap 12.

Each part of the canister 10 comprises resilient and damping elements 14, 15.

A ring-shaped inner wall 20 of the canister 10 is designed for providing a support to the piston-like shaped part 16 of the shaft 13 on the entire circumference of the canister 10. One function of the inner wall 20 is to limit the stroke of the shaft 13 inside the canister when the vibration isolator 1 operates in tension.

Stroke bumpers 22 may be introduced between the piston-like shaped part 16 of the shaft and the inner wall 20 of the canister 10 to avoid any shock between the piston-like shaped part 16 of the shaft 13 and the inner wall 20.

Some washers 25 are provided between the resilient element 14 and the end cap 11 and between the resilient element 14 and the shaft 13 for providing a flat support face to the resilient element 14. It allows saving weight to the vibration isolator 1 by having hollow sections both in the shaft 13 and in the end cap 11.

A spacer 19 is disposed between the end cap 12 and the stack of resilient and damping elements 15. It allows compensating the space non-occupied by the resilient and damping elements 15 in the second part of the canister. This spacer 19 could be replaced by one or several washers which total length is identical to the length of the spacer. If the number of resilient and damping elements 15 increases, the spacer 19 may be removed.

The vibration isolator 1 also comprises a washer 21 disposed around the shaft 13 between the stack of resilient and damping elements 15 and the inner wall 20 of the canister 10. This washer 21 has an identical surface to the resilient and damping elements 15 so that it may transmit a homogeneous effort to the resilient and damping elements 15 on their whole surface.

The resilient and damping elements 14, 15 are metal mesh cushions.

In this variant, the first part of the canister 10 comprises only one metal mesh cushion 14 whereas the second part of the canister 10 provides a stack 15 of three metal mesh cushions.

The metal mesh cushions 15 are all identical, but differ from the metal mesh cushion 14 used in the first part of the canister.

The metal mesh cushion 14 has the following features:
type of material: stainless steel
mass: 31 g
forming load: 7.8 t
number of wires: 38
diameter of a wire: 0.009 inch
section of the cushion: 1.168 inch$^2$ The behaviour of one metal mesh cushion 14 is provided on FIG. 5(a), which shows the evolution of the effort applied to this cushion, intended to be placed in the first part of the canister of FIG. 4, as a function of the stroke of a mechanical piece applying this effort to the cushion.

No pre-load is applied to the cushion 14. Indeed, in the vibration isolator 1, the end cap 11 is screwed on the canister 10 so that it does not apply any stress on the cushion 14.

The metal mesh cushions 15 have all the following features:
type of material: stainless steel
mass: 23 g
forming load: 9 t
number of wires: 38
diameter of a wire: 0.009 inch
section of the cushion: 1.024 inch$^2$ The behaviour of one metal mesh cushion 15 is provided on FIG. 5(b), which shows the evolution of the effort applied to this cushion, intended to be placed in the second part of the canister of FIG. 4, as a function of the stroke of a mechanical piece applying this effort to the cushion.

The pre-load applied to a cushion 15 is shown by the straight line on FIG. 5(b) and is 800 Lbf. For that, the end cap 12 is screwed on the canister 10 in order to apply this pre-load.

Contrary to the first embodiment, it is here possible to apply a pre-load on the metal mesh cushion(s) comprised in the first part of the canister 10 which differs from the pre-load applied to the metal mesh cushion(s) comprised in the second part of the canister 10. It is made possible thanks to the screwable end caps 11, 12 together with the inner wall 20.

As mentioned for the first embodiment, the behaviour of the vibration isolator 1 for this second embodiment depends on the type of cushion, the pre-load applied to the cushion(s) and on the number of cushions comprised in the stack.

All these features are of equal importance.

Of course, another arrangement of the metal mesh cushions 14, 15 may be made depending on the desired features of the vibration isolator 1.

An evolution of the tangential stiffness of the vibration isolator 1 shown on FIG. 4, as a function of the stroke of the shaft 13 inside the canister, 10 is given on FIG. 6(*a*).

The metal mesh cushions 14, 15 used are those mentioned above, which behaviour is respectively illustrated on FIGS. 5(*a*) and 5(*b*).

As can be seen on FIG. 6(*a*), the tangential stiffness obtained when the vibration isolator 1 operates in tension is decoupled from its tangential stiffness when it operates in compression. It means that the vibration isolator 1 may operate, in tension, with a tangential stiffness which does not depend on its tangential stiffness when it operates in compression, and inversely.

More precisely, in tension, the behaviour of the vibration isolator is highly non-linear whereas its behaviour is slightly non-linear, even quasi linear when it operates in compression.

The first nominal stroke (compression) of the shaft 13 is comprised between −0.12 and 0. The second nominal stroke (tension) is comprised between 0 and 0.02 inch, and preferably between 0 and 0.01 inch. The first and second nominal strokes of the shaft 13 are defined in the same way as for the first embodiment.

The tangential stiffness of the vibration isolator 1 is, on at least one part of the entire first nominal stroke of the shaft 13, and preferably on the entire first nominal stroke, at least twice as lower as its tangential stiffness on the entire second nominal stroke of the shaft. The ratio between the tangential stiffness of the vibration isolator when it operates in tension and it tangential stiffness when it operates in compression may exceed the value 3, 4, 5, 8 or even 10 for the entire first and second nominal strokes of the shaft 13, that is to say, in that case, between −0.12 inch and +0.02 inch.

The evolution of the tangential stiffness of the vibration isolator also provide two thresholds $Min_{S,T}$ and $T_1$ which existence can be explained as follows.

When the vibration isolator 1 operates in tension, the threshold $Min_{S,T}$ corresponds to the pre-load applied to the stack of metal mesh cushions 15 by the end cap 12 against the inner wall 20 of the canister 10, through the spacer 19, the cushions 15 and the washer 21.

During this phase, the washer 21 can slide along the shaft 13, thanks to a step 160 made in the piston-like shaped part 16 of the shaft 13. This washer 21 allows a homogeneous distribution of the effort on the cushions 15.

When the vibration isolator 1 operates in compression, the washer 21 is not in contact with the step 160 so that the pre-load exerted by the end cap has no effect on the tangential stiffness provided by the metal mesh cushion 14.

This design allows obtaining a step around the static position (no deflection) of the vibration isolator 1 between the stiffness obtained when the vibration isolator operates in tension and its stiffness when it operates in compression.

The minimum stiffness $Min_{S,T}$ is close to 25,000 Lbf/inch on FIG. 6(*a*). It also means that there exists a minimum effort $Min_{E,T}$ to move the shaft 13, which is 800 Lbf on graph 6(*b*).

Consequently, when the vibration isolator 1 operates in compression, the tangential stiffness obtained close to the zero deflection of the shaft is very low.

Thus, the displacement of the shaft 13 is easier than for the first embodiment, so that it also improve the damping brought by the metal mesh cushion 14.

Compared to the first embodiment, the damping of the vibrations obtained when the vibration isolator operates in compression is better from the beginning of the landing of the aircraft.

The threshold $T_1$ corresponds to the transition between the nominal operation of the vibration isolator in compression and a non-nominal operation. As can be seen on FIG. 6(*a*), the value of $T_1$ is close to $T_1$=−0.12 inch.

This threshold is obtained when the metal mesh cushion 14 comprised in the first part of the canister 10 cannot be further compressed. As a consequence, its rigidity quickly increases and prevents any further displacement of the shaft. It means that, beyond the threshold $T_1$, any displacement of the door of the landing gear trap relative to the landing gear is prevented, so that the door cannot slam against the landing gear.

The corresponding evolution of the external effort applied to the shaft 13 as a function of its stroke inside the canister is shown on FIG. 6(*b*).

The low tangential stiffness provided by the metal mesh cushion 14 implies a large deflection of the shaft, which is used for providing a good damping during the nominal operation.

When the vibration isolator 1 operates in compression, the low tangential stiffness provided by the metal mesh cushions 14 implies a larger deflection of the shaft. This larger deflection is used for providing a good damping in nominal operation. Indeed, when the vibration isolator 1 operates in compression, it provides a damping factor f such that $f \geq 0.18$ for a frequency comprised between 8 Hz and 12 Hz during the lifetime of the vibration isolator.

The lifetime of the vibration isolator should be at least the same as the lifetime of the aircraft.

This damping factor f is such that $f \geq 0.25$ when the vibration isolator 1 operates for the first time in compression.

It means that most of the vibrations coming from the ground through the landing gear during landing are damped by the vibration isolator.

FIG. 7(*a*) shows the hysteresis evolution of the effort applied to the shaft 13 of the vibration isolator 1 shown on FIG. 4 when it operates in compression, from which the damping factor $f \geq 0.25$ can be calculated.

When the stroke of the shaft reaches the threshold $T_1$, its speed is close to zero. Anyway, to avoid any shock between the spacer 19 and the bearing 17 when the threshold value $T_1$ is reached, the vibration isolator 1 may comprise an end stroke bumper (not shown).

A good damping is also obtained when the vibration isolator 1 operates in tension. Indeed, it then provide a damping factor f such that $f \geq 0.18$ for a frequency comprised between 8 Hz and 12 Hz during the lifetime of the vibration isolator.

This damping factor f is such that $f \geq 0.2$ when the vibration isolator 1 operates for the first time in tension.

During the flight, few vibrations are transmitted from the door to the landing gear through the vibration isolator.

FIG. 7(*b*) shows the hysteresis evolution of the effort applied to the shaft 13 of the vibration isolator 1 shown on FIG. 4 when it operates in tension, from which the damping factor $f \geq 0.2$ can be calculated.

FIG. 8 shows a variant of the second embodiment of the vibration isolator 1.

In this variant, there is provided an additional damping means 24, for example a rubber pad made of elastomer, which is arranged around the shaft 13 in such a way that it does not bear any load. For that, the damping means 24 may be provided inside the spacer 19 which comprises, in that aim, a receiving cavity.

All other features are the same as that one described for the second embodiment.

The embodiments described above implement cushions which specific features which are provided to illustrate the interest of the invention.

Anyway, metal mesh cushions having the following properties may be used:

type of material: stainless steel mass (w): 20 g≦w≦40 g for a vibration isolator intended to be located between a landing gear and the door of the landing gear trap and up to 500 g for other types of applications;

forming load: it depends on the highest load between the maximal static load that the vibration isolator may bear and the dynamic load to bear;

number of wires (n): 20≦n≦90, the wires may be made of one strand or of several strands;

diameter of a wire (d): 0.003 in.≦d≦0.009 in.;

section of a cushions (S): 0.5 inch²≦S≦2.5 inch²

Metal mesh cushions are known for years because they provide many advantages, as for example:

a high fatigue life;

a good ability to bear loads for one or several hours under low temperatures, for example above 10 000 Lbf;

high stiffness with a reduced volume (congestion) and without deterioration of fatigue life;

constant dynamic properties for a wide range of temperatures, for example from a temperature below −50° C. up to a temperature above +55° C., and a wide range of humidity rate so that it is not sensitive to humidity moisture and chemical aggression.

In addition, the manufacturing method of a cushion is well-known by one skilled in the art. The main steps which have to be implemented, after the selection of a wire (type of material, diameter of a wire and number of wires), are as follows:

a) knitting of a flat mesh with the wires;

b) shaping of the flat mesh, for example for giving a wave form;

c) cutting of the shaped mesh of step b), to select a part of the mesh, having a predetermined mass;

d) introducing the selected part in a die for the forming;

e) applying a forming load to the selected part which is in the die.

Metal mesh cushions are well suited to the operation conditions of a vibration isolator located between a landing gear and a door for closing the landing gear trap: low temperatures, aggressive and wet environments, load and fatigue due to successive landings of the aircraft, congestion due to the low dimensions of the vibration isolator.

Alternatively, at least one of the resilient and damping elements 14, 15 may be made of a combination between a metal mesh cushion and an elastomeric material, such as rubber as they both provide a high fatigue life, a good ability to bear loads and a wide range of operating temperatures, as mentioned here above.

The vibration isolator may be used in all kind of applications using a device comprising a moving part, a static frame to isolate from said moving part, wherein the vibration isolator is mounted between said moving part and said static frame, the maximum stiffness of the static frame being higher than the stiffness of the moving part.

For example, this kind of device can be met in a machine-tool. It can also be met in a motorboat or in a powerboat to isolate the vibrations of the motor.

Metal mesh cushions are commercialized by Barry Controls Aerospace under the trademark "Met-L-Flex". As mentioned above, their design depends on many parameters which are selected according to the application.

The invention claimed is:

1. A vibration isolator comprising:
a canister having ends closed by first and second end caps;
a shaft able to move inside the canister, the shaft comprising a piston shaped part separating the canister into a first part defined between the piston shaped part of the shaft and the first end cap, and a second part defined between the piston shaped part of the shaft and the second end cap, said first part comprising at least one first resilient element providing a damping function and able to be compressed by a compression movement of the shaft on a first nominal stroke, and said second part comprising at least one second resilient element providing a damping function and able to be compressed by a tension movement of the shaft on a second nominal stroke;
wherein a washer is disposed around the shaft, one side of the washer being in contact with the at least one second resilient element of the second part of the canister, the other side of said washer being able to be in contact with the piston-shaped part of the shaft when the vibration isolator operates in tension and able to be in contact with a ring-shaped inner wall of the canister when the vibration isolator operates in compression;
wherein at least one of the first and second end caps is screwable on the canister in order to adjust a pre-load exerted on said at least one of the first and second resilient elements through said element and said washer such that a step of tangential stiffness occurs at the transition between the two nominal strokes; and
wherein the tangential stiffness of the vibration isolator is, on the entire second nominal stroke of the shaft, at least twice as strong as the tangential stiffness on the entire first nominal stroke of the shaft.

2. A vibration isolator as claimed in claim 1, wherein the first part of the canister comprises a number of the first resilient elements providing a damping function which differs from the number of the second resilient elements providing a damping function comprised in the second part of the canister.

3. A vibration isolator as claimed in claim 1, wherein the at least one first and second resilient elements comprised in both parts of the canister are identical.

4. A vibration isolator as claimed in claim 1, wherein there is provided a spacer inserted between one of the end caps and said at least one of the first and second resilient elements.

5. A vibration isolator as claimed in claim 4, comprising a damping element between the spacer and the shaft disposed inside said spacer so that it does not bear any load on the shaft.

6. A vibration isolator as claimed in claim 1, wherein there is provided at least one stroke bumper between the ring-shaped inner wall and the piston shaped part of the shaft for damping the end stroke of the shaft when the vibration isolator operates in tension.

7. A vibration isolator as claimed in claim 1, wherein said at least one of the first and second resilient elements is a metal mesh cushion.

8. A vibration isolator as claimed in claim 7, wherein the metal mesh cushion is made of stainless steel and has the following features:
number of wires n wherein 20≦n≦90, diameter d of a wire wherein 0.003 in.≦d≦0.009 in., mass w wherein 20 g≦w≦40 g, and section s of the cushion wherein 0.5 inch²≦S≦2.5 inch².

9. A vibration isolator as claimed in claim 1, wherein said at least one of the first and second resilient elements also comprises an elastomeric material.

10. A vibration isolator as claimed in claim 1, wherein said vibration isolator provides a damping factor f such that f≧0.18 for a frequency comprised between 8 Hz and 12 Hz during a lifetime of the vibration isolator when the vibration isolator operates in compression, the damping factor f being such that $f \geq 0.25$ when the vibration isolator operates for the first time in compression.

11. A vibration isolator as claimed in claim 1, wherein said vibration isolator provides a damping factor f such that $f \geq 0.18$ for a frequency comprised between 8 Hz and 12 Hz during a lifetime of the vibration isolator when the vibration isolator operates in tension, the damping factor f being such that $f \geq 0.2$ when the vibration isolator operates for the first time in tension.

\* \* \* \* \*